No. 739,449. PATENTED SEPT. 22, 1903.
C. SCHMID.
VALVE MECHANISM FOR STEAM ENGINES.
APPLICATION FILED JAN. 29, 1902.
NO MODEL. 4 SHEETS—SHEET 2.
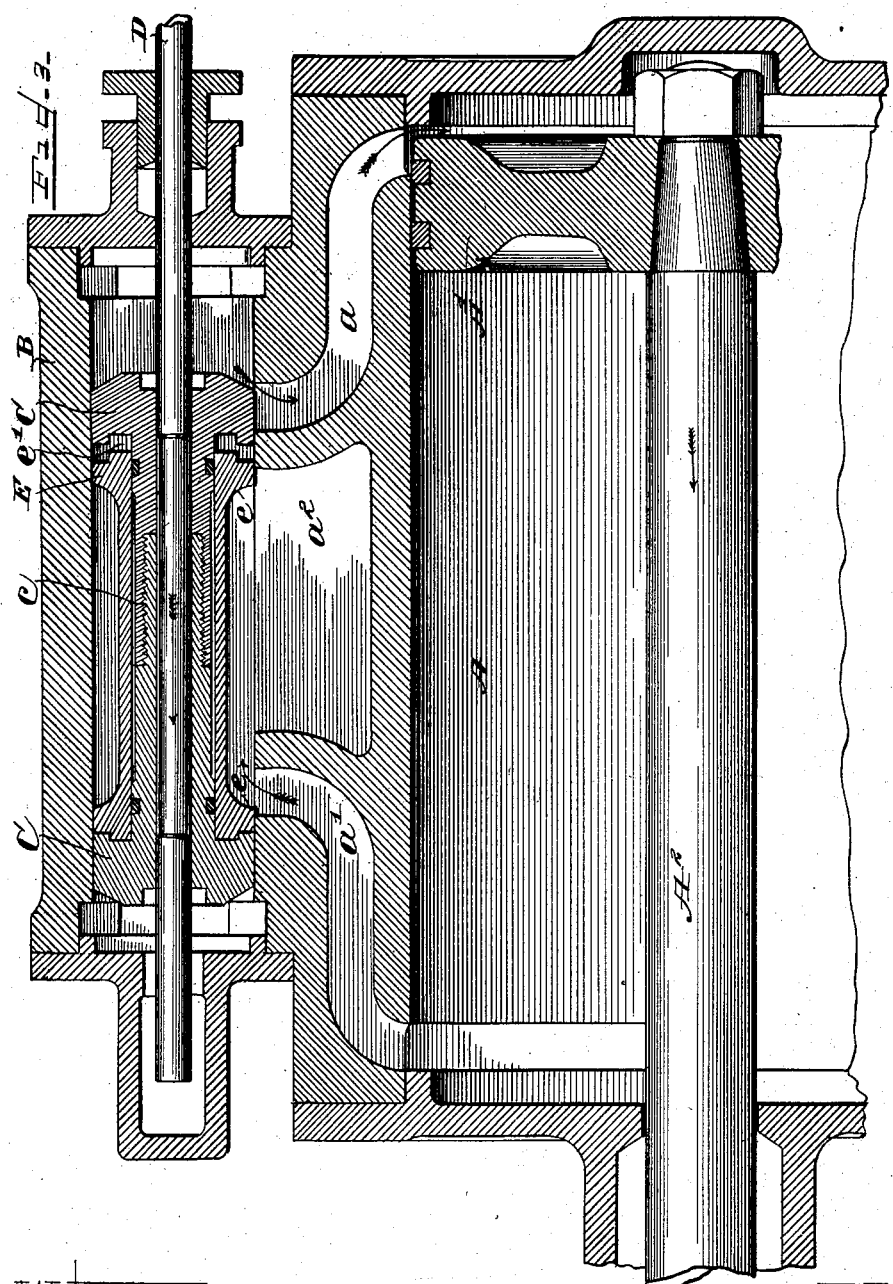

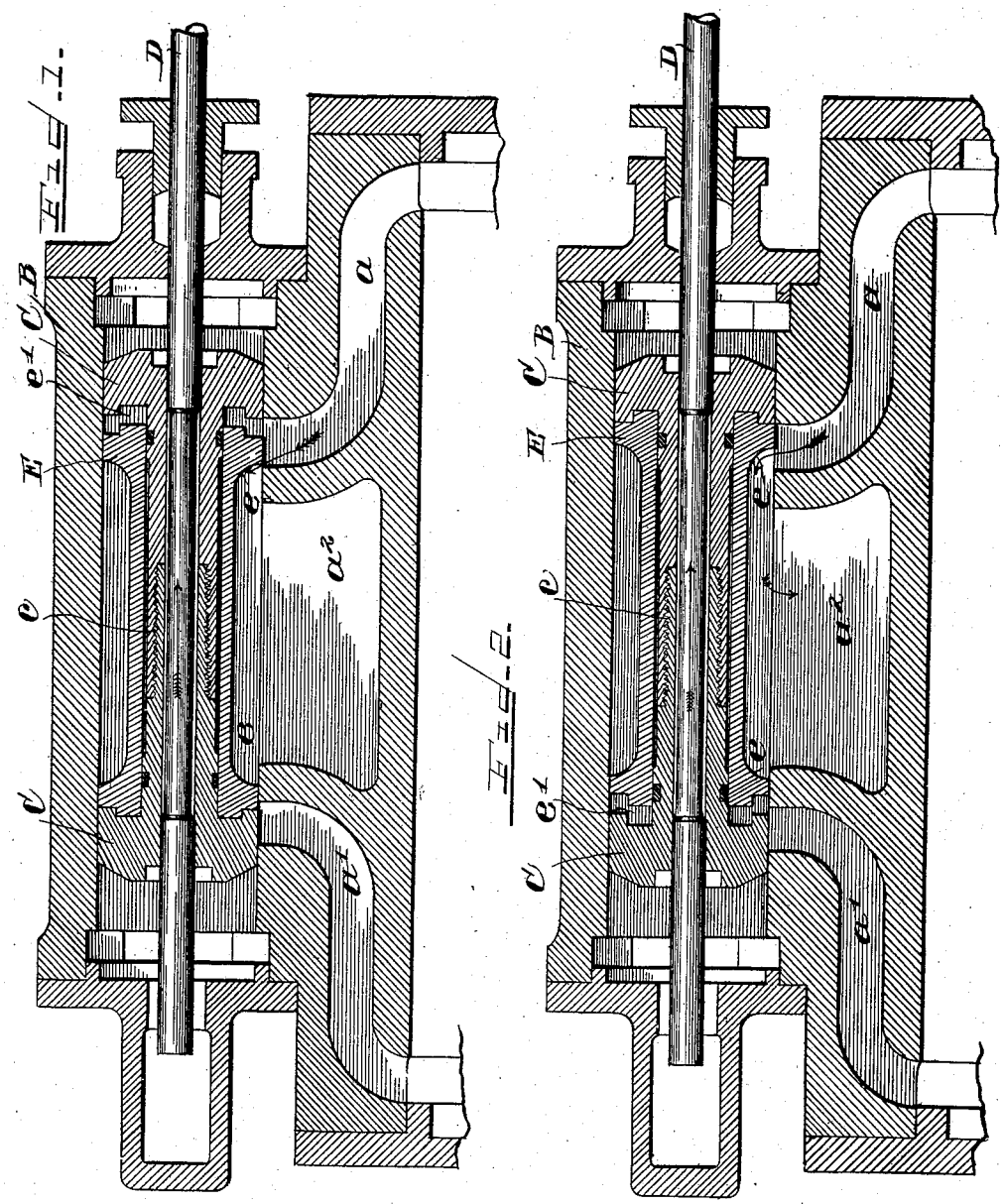

No. 739,449. PATENTED SEPT. 22, 1903.
C. SCHMID.
VALVE MECHANISM FOR STEAM ENGINES.
APPLICATION FILED JAN. 29, 1902.
NO MODEL. 4 SHEETS—SHEET 3.
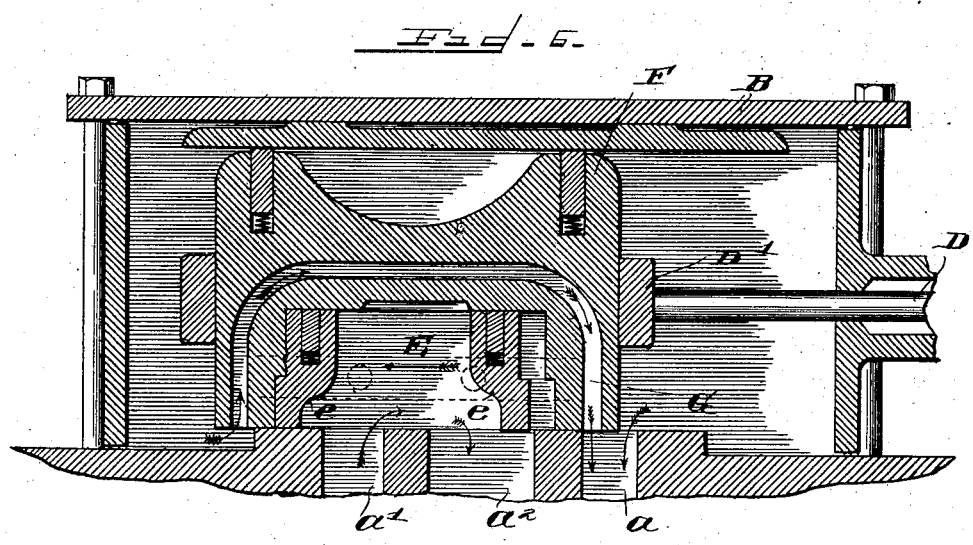
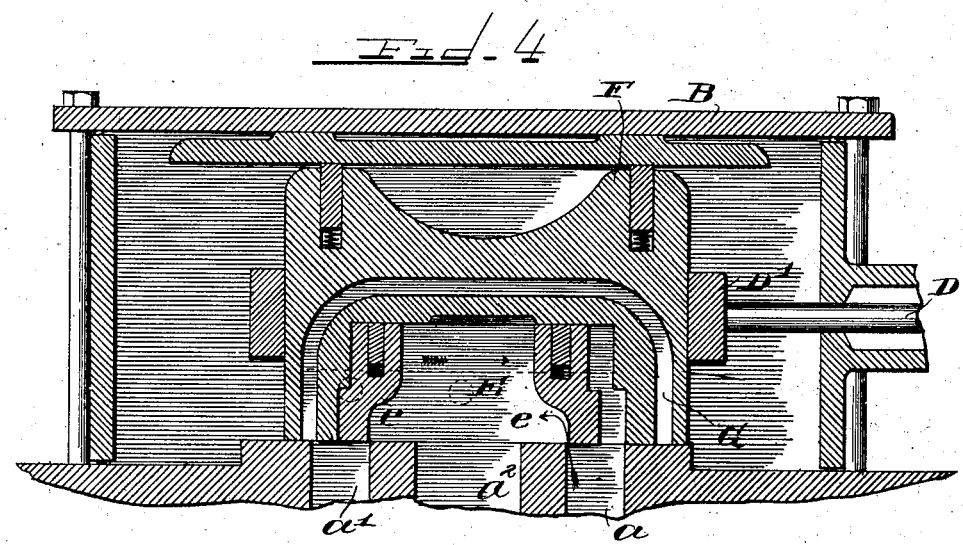
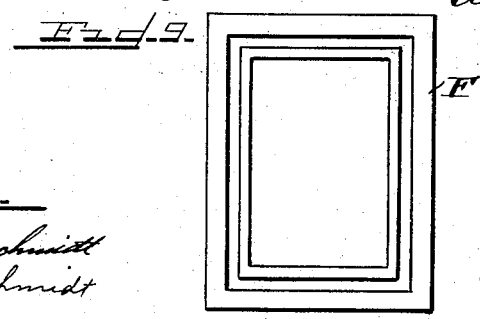

No. 739,449. PATENTED SEPT. 22, 1903.
C. SCHMID.
VALVE MECHANISM FOR STEAM ENGINES.
APPLICATION FILED JAN. 29, 1902.
NO MODEL. 4 SHEETS—SHEET 4.
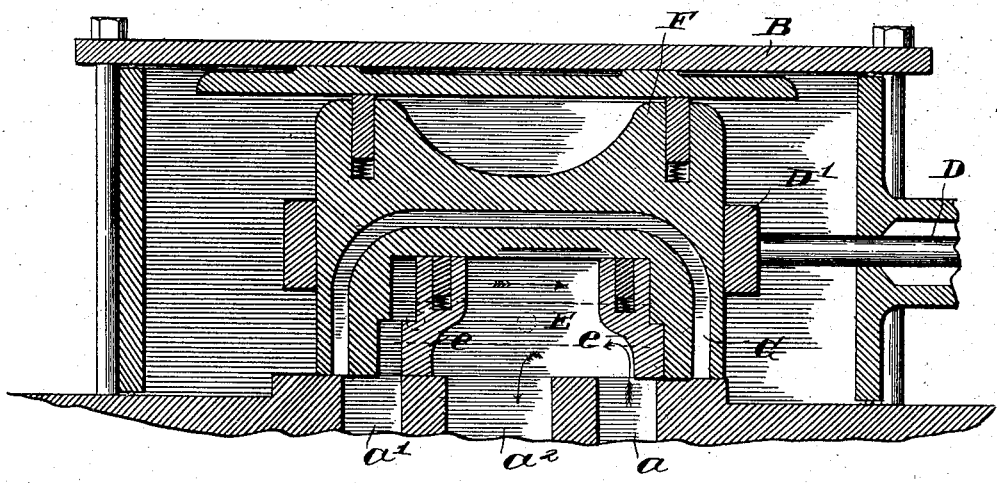
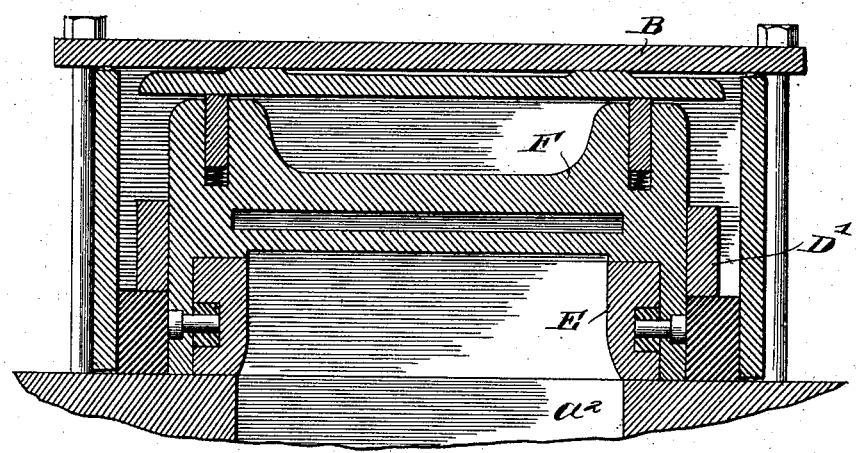
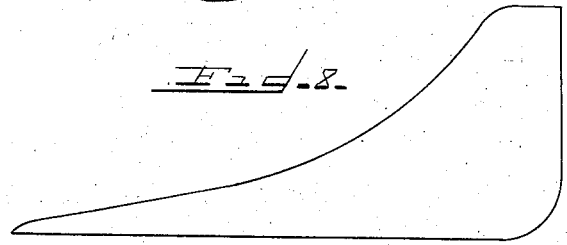

No. 739,449. Patented September 22, 1903.

UNITED STATES PATENT OFFICE.

CHARLES SCHMID, OF CHICAGO, ILLINOIS, ASSIGNOR OF ONE-HALF TO WILLIAM P. GREENHILL, OF CHICAGO, ILLINOIS.

VALVE MECHANISM FOR STEAM-ENGINES.

SPECIFICATION forming part of Letters Patent No. 739,449, dated September 22, 1903.

Application filed January 29, 1902. Serial No. 91,670. (No model.)

*To all whom it may concern:*

Be it known that I, CHARLES SCHMID, a citizen of the United States of America, residing at Chicago, in the county of Cook and State of Illinois, have invented certain new and useful Improvements in Valve Mechanism for Steam-Engines, of which the following is a description.

My invention is in the nature of an improvement upon the invention shown and described in Letters Patent issued to me on December 10, 1895, No. 551,049.

The object of this invention is to simplify and economize the construction of the valve mechanism shown and described in said patent.

To this end my invention consists in the novel construction, arrangement, and combination of parts herein shown and described, and more particularly pointed out in the claims.

In the drawings, wherein like reference-letters indicate like or corresponding parts, Figure 1 is a sectional view of the steam-chest and valve of a steam-engine, showing a part of the steam-cylinder thereof. Fig. 2 is a similar section showing the parts in a slightly-different position. Fig. 3 is a similar view showing the parts in still another position. Figs. 4, 5, and 6 show sections of the steam-chest provided with a slightly-modified form of steam-valve, also shown in section, the several views showing different positions of the valve. Fig. 7 is a cross-section of Fig. 5. Fig. 8 represents an indicator-card taken from an engine, showing the improved operation of said engine when equipped with my improvement; and Fig. 9 is a top plan of the supplemental valve shown in Figs. 4, 5, and 7.

In the drawings, A represents the cylinder, A' the piston therein, and A² the piston-rod. B is the steam-chest, provided with valve C, operated by the valve-stem D.

E is a supplemental valve arranged within the inclosing walls of valve C and constructed to provide an independent movement thereof for purposes hereinafter stated. The valve E is provided with inclined inner walls $e$ so formed that the impinging steam from the cylinder will serve to shift or operate said valve independently of the main valve C. $a$ and $a'$ are the usual steamways from the steam-chest into the cylinder, and $a^2$ is the exhaust-port.

In the form shown in Figs. 1, 2, and 3 the valve C is constructed in the form of a piston and is known as a "piston-valve." The valve E is in the form of a spool supported by the valve C and maintained in position by the inclosing walls of the steam-chest. As shown, it is of a length less than the distance between the end walls of valve C for the purposes stated.

Upon the inner face of each end of the valve C is preferably formed a recess or chamber $e'$, and the end of the valve E is correspondingly constructed to coöperate with said recess or chamber as the valve is moved backward and forward. The object of this construction is the cushioning of the contact of the parts, thus preventing the shock or noise. In order to assemble the parts, it is necessary that the valve C be formed in sections in order that the spool-valve E may be placed thereon. For this purpose I prefer to construct the parts with a screw-threaded connection, as shown at $c$.

The operation of my improvement as thus far described is as follows: As shown in Fig. 1, the valve C is moving in the direction indicated by the arrow on the valve-stem, and at the moment the parts assume the position shown in said Fig. 1 the steam has been shut off and the inner edge of the auxiliary valve E has reached the port $a$, the steam entering between the wall of the valve E and the bridge-wall between $a$ and $a^2$, impinges upon the inclined face $e$ of the valve E, and forces the valve to the right, permitting the instant opening of the port to the extent permitted by the movement of the valve E for the escape of the steam. (See Fig. 2.) The continued movement of the valve E with the main valve C serves to open the passage $a$ sufficiently to allow the full and complete escape of the steam over the bridge-wall and through the exhaust-port $a^2$. In this operation the steamway $a'$ is opened in the usual manner and the steam is admitted to the opposite end of the cylinder. As shown in Fig. 3, the valve is moving in the opposite direction and the parts are in a position when the exhaust-steam is admitted to the port $a^2$ through the way $a'$ and the live steam is admitted to the steam-way $a$ and conducted to the opposite end of the piston A'.

As shown in Figs. 4, 5, 6, and 7, the main valve is not constructed in the piston form, as shown in the preceding figures. The said valve is secured to the valve-stem D by the yoke D', and the auxiliary valve E is positioned within the main valve substantially as shown in the preceding figures. The only difference results from the different form of the main valve. The operation is substantially the same as before described, the position of the various parts in the operation of the device being clearly shown in Figs. 4, 5, and 6. As an independent improvement I prefer when my invention is embodied in the form shown in Figs. 4, 5, 6, and 7 to construct an auxiliary steamway G through F, extending from the live-steam chamber on one side of the valve to the live-steam chamber opposite. The object is to primarily conduct live steam from the opposite end of the steam-chest to give the piston its first impulse before the valve regularly opens the port for the purpose. This construction, in connection with the quick release of steam afforded by means of the operation of the auxiliary valve E, as clearly shown in Figs. 4, 5, and 6, forms an important improvement in the quick action of the engine and in the economy of steam. As set forth in my previous patent, the use of the supplemental valve E increases the inside lap of the steam-valve without interfering with the quick release of the steam, while the auxiliary steamway G admits a portion of the steam to the steamway on the opposite side of the piston before the valve has reached the point to admit the steam in the usual manner.

In the construction shown in my previous patent referred to the steam passes between the supplemental valve and the lower wall of the cavity-plate, thereby shifting the supplemental valve. In practice it has been found that it is not necessary that the steam shall pass between said valve and an opposed fixed portion of the main valve, as the action of the steam upon the inclined face of the supplemental valve is sufficient for said purpose. By the "inclined face" I wish to be understood as meaning a face so formed that the impinging steam will serve to shift the supplemental valve. As shown in the drawings, the inner faces of the supplemental valve are formed more in accordance with a curved line, and this serves the purpose sought. By the term "inclined face" in the claims, therefore, I wish to be understood as meaning a face so formed that the contact of the impinging steam will shift said valve, as set forth.

Having thus described my invention, it is obvious that various immaterial modifications may be made without departing from the spirit of my invention. Therefore I do not wish to be understood as limiting myself to the exact form and construction shown.

Having thus described my invention, what I claim as new, and desire to secure by Letters Patent, is—

1. In valve mechanism a piston steam-valve formed in a plurality of parts, and constructed to be connected to complete the valve, in combination with a spool-shaped supplemental valve located between the ends of the piston and longitudinally movable therein substantially as described.

2. In valve mechanism, the combination with a piston main valve having the inner surfaces of its ends recessed or chambered, of a spool-shaped supplemental valve located between the ends of the piston-valve and longitudinally movable between the same, and having its ends correspondingly formed to cushion the movement of the supplemental valve substantially as described.

3. In valve mechanism, the combination with a piston main valve C, formed in two parts and adapted to be connected to complete the whole, the inner surface of the ends of said valve being chambered, in combination with the supplemental valve E, arranged between the ends of the piston-valve C, and longitudinally movable between the same, and having its ends formed to correspond with the chambers $e'$, substantially as described.

4. Valve mechanism comprising a main piston-valve having the inner surfaces of its ends recessed or chambered to form pockets, of a supplemental spool-shaped valve located between the ends of the main valve and longitudinally movable therebetween, the outer surfaces of the ends of the supplemental valve being formed to enter the pockets of the main valve whereby the movements of said supplemental valve are cushioned; substantially as described.

5. Valve mechanism comprising a main valve having the inner surfaces of its ends recessed or chambered to form pockets, of a supplemental valve located between the ends of the main valve and longitudinally movable therebetween, the outer surfaces of the ends of the supplemental valve being formed to enter the pockets of the main valve whereby the movements of said supplemental valve are cushioned; substantially as described.

6. Valve mechanism comprising a piston-valve, and a spool-shaped supplemental valve shiftable between the ends of the piston-valve, the outside lap of the piston-valve being of sufficient length to permit the spool-shaped valve and the space between the same and the piston-valve to pass the inlet-ports before live steam is admitted thereto; substantially as and for the purpose described.

7. Valve mechanism comprising a main valve having the inner surfaces of its ends recessed or chambered, a supplemental spool-shaped valve located between the ends of the main valve and longitudinally movable between the same, the ends of said supplemental valve being formed to correspond to the recessed or chambered surfaces of the main valve whereby the movement of the supplemental valve is cushioned, substantially as described.

8. Valve mechanism comprising a main valve constructed of separable sections and having a contracted portion intermediate its ends, and a supplemental valve of a length less than the space between the ends of the main valve slidable upon said contracted portion of the main valve, substantially as and for the purpose described.

9. A piston-valve of the character described having a divided contracted portion intermediate its ends, and means for securing the sections of the contracted portion together, in combination with a supplemental valve slidable along said contracted portion, substantially as described.

10. A piston-valve of the character described having a divided contracted portion intermediate its ends, the sections of said contracted portion being screw-threaded together, in combination with a supplemental valve slidable along said contracted portion, substantially as described.

11. Valve mechanism comprising a piston steam-valve having a divided contracted portion intermediate its ends, means for securing the sections of said contracted portion together, and a spool-shaped supplemental valve arranged between the ends of the piston-valve and slidable longitudinally thereof over the contracted portion of the same, substantially as described.

12. Valve mechanism comprising a piston steam-valve having a divided contracted portion intermediate of its ends, means for securing the sections of said contracted portion together, and a spool-shaped supplemental valve arranged between the ends of the piston-valve and slidable longitudinally thereof over the contracted portion of the same, the outside lap of the piston-valve being of sufficient length to permit the supplemental valve and the space between the same and the piston-valve to pass the inlet-ports before live steam is admitted thereto, substantially as and for the purpose described.

13. Valve mechanism comprising a piston steam-valve having a contracted portion intermediate of its ends, and a spool-shaped supplemental valve arranged between the ends of the piston-valve and slidable longitudinally thereof over the contracted portion of the same, the outside lap of the piston-valve being of sufficient length to permit the supplemental valve and the space between the same and the piston-valve to pass the inlet-ports before live steam is admitted thereto, substantially as and for the purpose described.

CHARLES SCHMID.

In presence of—
JOHN W. HILL,
CHARLES I. COBB.